United States Patent [19]

Swanson

[11] 4,340,486
[45] Jul. 20, 1982

[54] OIL SORBENT STRUCTURES AND METHOD OF PICKING UP OIL

[75] Inventor: Clare E. Swanson, White Bear Lake, Minn.

[73] Assignee: Conwed Corporation, St. Paul, Minn.

[21] Appl. No.: 67,158

[22] Filed: Aug. 16, 1979

Related U.S. Application Data

[63] Continuation of Ser. No. 861,641, Dec. 19, 1977, abandoned.

[51] Int. Cl.³ .............................................. C02F 1/28
[52] U.S. Cl. .................................... 210/693; 210/924
[58] Field of Search ............. 210/DIG. 26, 30 A, 40, 210/DIG. 25, 502, 24, 693, 924

[56] References Cited

U.S. PATENT DOCUMENTS

| | | | |
|---|---|---|---|
| 3,764,527 | 10/1973 | Sohl | 210/30 A |
| 3,960,722 | 6/1976 | Tomehawa et al. | 210/DIG. 26 |
| 3,966,597 | 6/1976 | Omori et al. | 210/DIG. 26 |
| 4,107,051 | 8/1978 | Lorentzen | 428/233 |

FOREIGN PATENT DOCUMENTS

| | | | |
|---|---|---|---|
| 49-33741 | 9/1974 | Japan | 210/DIG. 26 |
| 50-65488 | 6/1975 | Japan | 210/DIG. 26 |

*Primary Examiner*—James J. Bell
*Attorney, Agent, or Firm*—Eyre, Mann, Lucas & Just

[57] ABSTRACT

A mass of net-like material of oleophilic, hydrophobic netting material is formed from strips of netting secured into a loose mass. Oil contacting the mass is sorbed by the strands and tends to bridge the openings in the net-like material to increase the short term oil pick up capacity.

5 Claims, 4 Drawing Figures

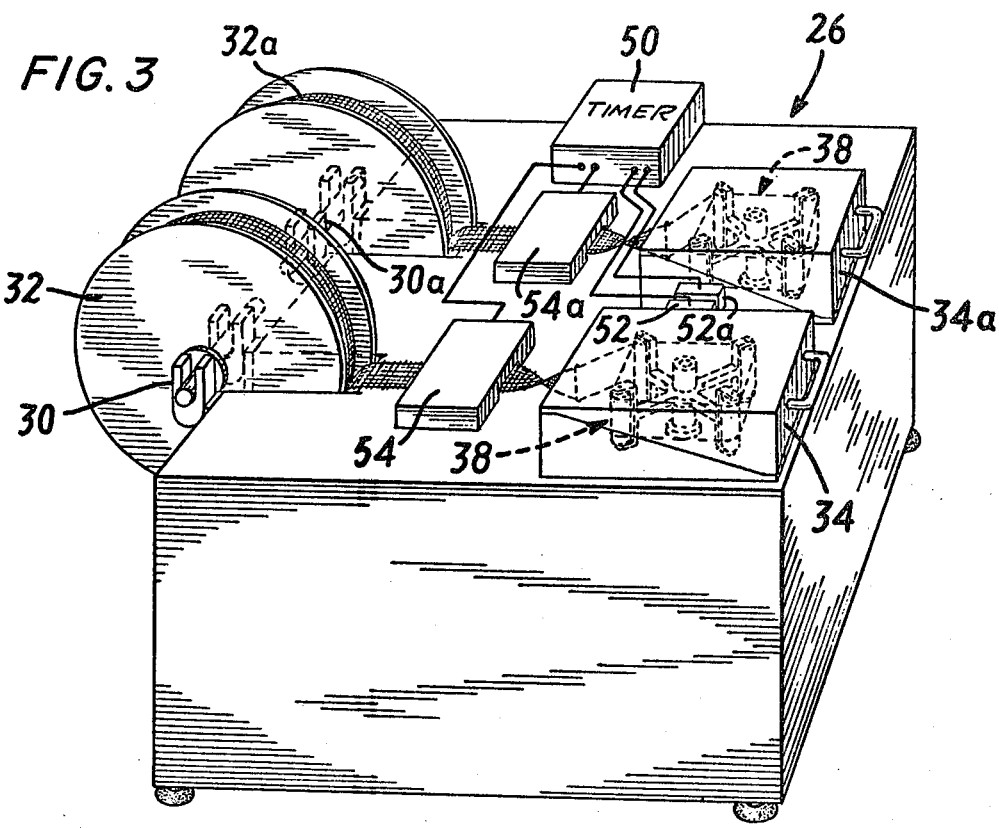
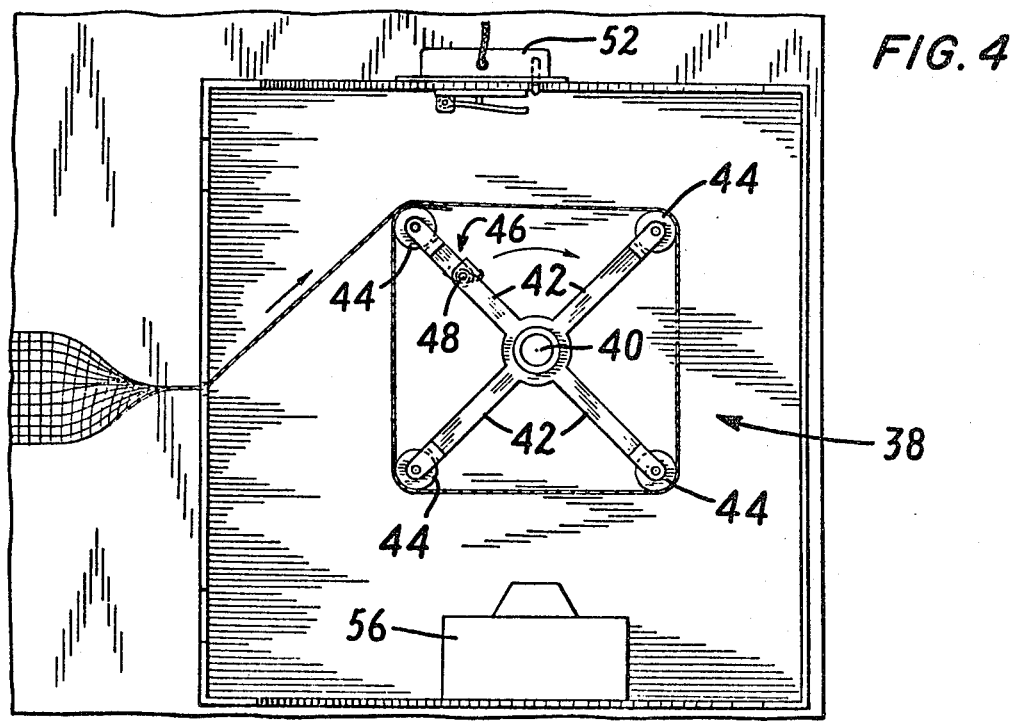

OIL SORBENT STRUCTURES AND METHOD OF PICKING UP OIL

This is a continuation of application Ser. No. 861,641, filed Dec. 19, 1977, now abandoned.

BACKGROUND OF THE INVENTION

It is known to use strands of oleophilic, hydrophobic polypropylene in a mop to sorb and collect oil from an oil-water mixture. U.S. Pat. No. 3,748,682 shows such an application of polypropylene strands. The referenced patent also references U.S. Pat. No. 3,668,118 on a similar subject matter. The mop is fabricated of lengths of 2.0 mils thick by one-eighth inch wide strips of polypropylene joined at the midpoint to form an oil mop.

SUMMARY OF THE INVENTION

The present invention teaches an oil sorber which can be shaped into a mass adapted to attachment to a handle or can be used without a handle to sorb oil either alone or in an oil-water mixture. The oil sorber of the present invention represents a substantial improvement over oil sorber mops made of a plurality of strands of polypropylene material.

In accordance with a preferred embodiment of the present invention, a narrow strip of plastic netting preferably of polypropylene is wound into a loose skein. The skein is secured by a suitable binding means such as wire, plastic string, or the like at at least one point on the perimeter.

The amount of oil picked up by a given weight of sorber is important since it defines the amount of material needed for accomplishing a given amount of sorption. The applicant has discovered that the use of a mesh-type plastic sorber material exhibits a surprisingly large increase in short term oil retention as compared to strips of material having an equivalent weight. This increase in short term oil retention appears to be due to the oil temporarily bridging the openings in the mesh. This phenomenon is not exhibited by the prior art oil sorbers made of strands of plastic. The improvement in sorption is even greater with heavy oil.

The bridging phenomenon has the additional useful property that it is a short term effect. Thus, the oil can be sorbed, removed with the sorbent mass and placed for example in a barrel to be drained or squeezed out as for example by wringing.

The plastic netting suitable for use in the present invention is a well-known material and is not something that we have discovered. Plastic netting may be formed according to a number of known processes, see for example U.S. Pat. Nos. 3,674,898, 3,917,889, 3,700,521, 3,252,181 and 3,384,692. In each of these patents there is a disclosure of forming an extruded net with two sets of strands which cross at an angle. After initial formation, the nets are oriented to stretch the sets of strands. With so-called "diamond mesh" net such as produced under U.S. Pat. No. 2,919,467, the orientation can be carried out by rope form stretching as described herein. With so-called "square mesh" nets such as are disclosed in the other patents mentioned above, orientation is suitably carried out in successive stages in a drafter and tenter as disclosed, for example, in British Pat. No. 1,235,901.

In accordance with the present invention, it is preferred to use a biaxially oriented net (i.e. all strands have been oriented) weighing from about ½ to about 5 pounds per 1,000 square foot. The nets suitably have from 1 to 10 strands per lineal inch in each direction and preferably have from 2 to 5 strands per inch. It will be appreciated that rectangular mesh nets in which there are more strands per inch in one direction than there are in another direction. It will also be appreciated that nets having more than two sets of strands can be employed if desired.

The strips of net from which the oil sorber of the present invention are formed are preferably less than about 2 feet wide and are suitably from about 2 inches to about 10 inches. The minimum width of the net strips is a width of at least 3 interstices. For example, if there are 3 interstices per lineal inch of net in the width direction, the minimum width would be 1 inch. The length of the net strip is of little consequence. As hereinafter described, the net is suitably formed as a skein and is preferably formed from one continuous length of net. However, the oil sorber of the present invention could be formed by bridging together a number of strips of suitable length, e.g. 1 foot. Such a structure made from a plurality of strips of net could be bound in the middle or at either or both ends.

In the biaxial orientation of square mesh net in a drafter followed by a tenter, the edge of the net is usually grabbed in the tenter by clips or pins, a process well known in the art. This will leave part of the edge of the unoriented in the transverse direction as a result of which this edge strip is usually cut off. The width of this strip is about 4 to 8 inches. Even though the net is not completely oriented in the transverse (width) direction, this material is very suitable for use in the present invention. In fact, this edge material is normally considered to be an undesirable scrap which must be disposed of and the present invention provides an excellent use for this material which would otherwise be wasted.

The particular material from which the oil sorber of the present invention is formed is not critical so long as it is a material which is oleophilic and hydrophobic and can be formed into a flexible net-like structure. Preferred materials are polyethylene and polypropylene because of their relatively low cost and common usage but other materials such as copolymers of the foregoing, other polyolefins, nylons, esters such as polyethylene terephthalate, polytetramethylene terephthalate and the like, may also be employed.

These and other features of the present invention may be more fully understood with respect to the accompanying drawings and the following description of the drawings and examples of use of the present invention.

BRIEF DESCRIPTION OF THE DRAWINGS

FIG. 3 shows an apparatus for winding the skein of FIG. 2.

FIG. 4 shows a plan view of the skein winder.

DETAILED DESCRIPTION OF THE PREFERRED EMBODIMENT

Figure 1:
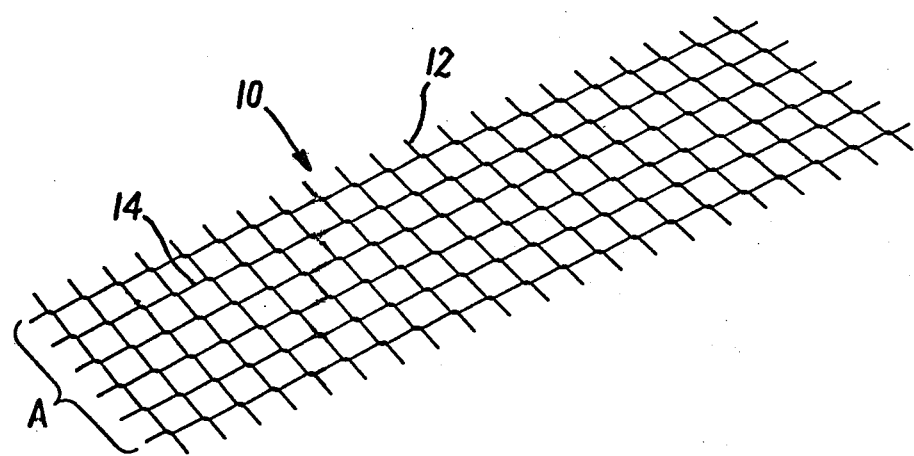
FIG. 1 shows a strip of plastic net material.

Referring to FIG. 1 a strip of netting is shown at 10. The netting is a continuous strip in which the lateral edges have been severed through the netting strands leaving bristles 12 extending outward from the main body 14 of the strip 10. The small bristles 12 are useful in that they provide a roughness which is useful in providing mild abrasion against oil coated surfaces to mechanically dislodge and then sorb oil soaked dirt. This structure is particularly useful, for example, in scrubbing an oil coated boat hull and for cleaning the interior of oil tanks and bilges. In accordance with the present invention there are at least three (3) interstices in the transverse dirction A.

Figure 2:
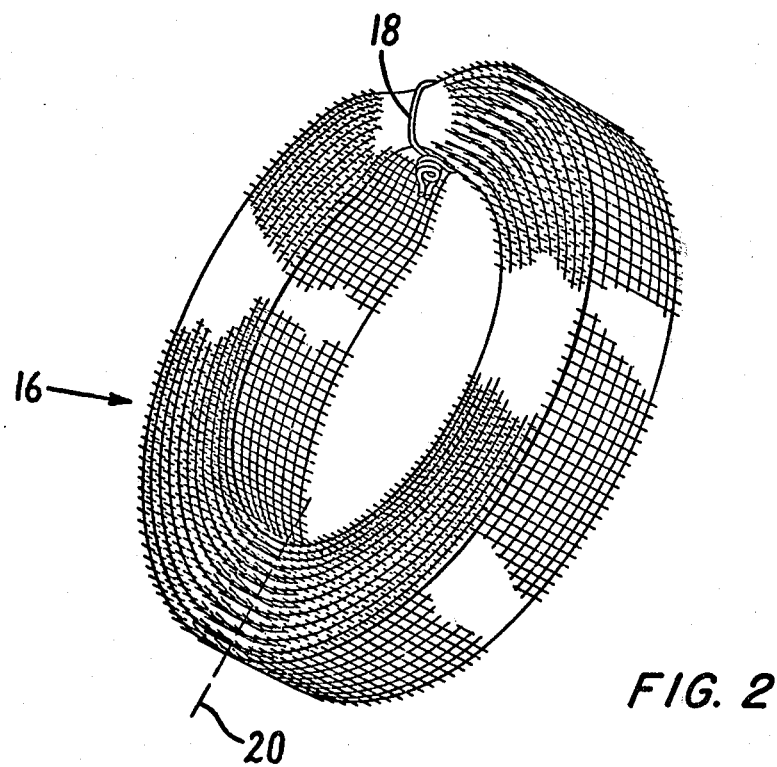
FIG. 2 shows a skein of plastic net material.

FIG. 2 shows a skein 16 made up of a strip of the netting of FIG. 1 loosely wound and secured at at least one location, suitably by tie 18. While one tie (or other binding means) is preferred, two or more may be used if desired. However, it is preferably that the net strips be left relatively loose with respect to each other so that they are slightly spaced and oil can be picked up which bridge adjacent, closely spaced, strips.

The tie is suitably wire, plastic string or a metal band. Other binding means can be used for securing the netting, e.g. a collar around one end, heat sealing of adjacent strips to each other, etc. Furthermore, the skein can be used in this fashion or it can be cut as indicated by the dashed line at 20 to form a mop-like structure of a plurality of strips. Oil sorbers, whether or not cut, can be secured by a mop handle (not shown), if desired, clamping the skein in the vicinity of the tie 18. Alternatively, the netting may be scramble wound. In fact, it has been found that when at least 50% of the loop strips have at least one twist in the middle the resulting structure appears to have even greater oil retention capability.

Turning now to FIG. 3, there is shown a skein winder 26 which may contain a drive motor and pulleys and shafts (not shown). At one side of the base 28 are first and second sprockets 30, 30a for holding reels 32, 32a to allow access to the interior. The covers 34 may be of metal, metal mesh, or plastic and are provided to protect the operator from injury due to contact with moving components therein.

Referring now to FIG. 4 there is shown a plan view of a winder reel 38 which is visible upon opening either cover 34 or 34a. The winder reel 38 has a driven axis 40 and a plurality of arms 42 terminating in vertical members 44. One of the arms 42 contains a release mechanism 46 such as a hinge 48 which enables removal of the skein after it is wound. The vertical members can be spools, round pegs or saddle shaped wires with the concave side facing outward.

To wind a skein, the netting is attached to one of the vertical members while winder reel 38 is stopped. The winder reel 38 is then started either manually or automatically, preferably by an interlock with the cover 34 or 34a. A linear measurement device, timer or weighing mechanism is used to limit the amount of netting in a skein. When a skein winding is completed, it may be tied by hand but is preferably automatically tied using automatic tying mechanism 56 of a type of well known in the art. Referring again to FIG. 4, a timer 50 is illustrated as the limiting mechanism. The timer is controlled by timing switches 52, 52a interlocked with the covers 34, 34a respectively. The timer operates cutters 54, 54a which automatically sever the netting strip. The skein winders 38 may be operated simultaneously or alternatively. If operated alternatively, one skein may be winding while the operator attaches the end of the netting to the other skein winder.

Where it is desired to have twists in at least some of the loops of the skein in accordance with the preferred embodiment of the invention, this can be accomplished by rotating the axis of reels 32 and 32a so that they are positioned transverse to the direction of feed and simultaneously holding the reels stationary. In this way, the net which is pulled off the reels will inherently be twisted as it is unwound.

Obviously, means other than the apparatus just described can be used for preparation of the oil sorber of the present invention. For example, the material may be gathered by hand and then tied off.

In a specific example according to the present invention, an oil sorber was prepared from a strip of plastic net which was approximately 6 inches in width. The net was a polypropylene square mesh net weighing approximately 1 pound per 1,000 square feet and having three stands per lineal inch in each of the transverse and longitudinal dimensions, i.e. there were 9 interstices per square inch of metal. The oil sorber was made on the apparatus hereinbefore described and the finished structure contained approximately 180 square feet of net. Loops of the oil sorber were approximately 36 inches in dimension and a single wire tie was used to hold the loops together. The net strip was a single continuous strip and the formed plurality of loops was bound together with a metal wire tie.

This oil sorber was compared to a commercially available oil sorber made according to U.S. Pat. No. 3,784,682.

The following table illustrates the oil sorbent performance of the present invention and compares it to the performance of the oil sorber disclosed in U.S. Pat. No. 3,748,682.

| | POUNDS OF OIL PER POUND OF SORBER | | | |
|---|---|---|---|---|
| | Measured After 5 Second Drain | | Measured After 60 Second Drain | |
| Fuel Oil | Applicant | U.S. Pat. No. 3,748,682 | Applicant | U.S. Pat. No. 3,748,682 |
| No. 6 | 158# | 51# | 68# | 25# |
| No. 5 | 87# | 35# | 23# | 14# |

The oil sorbed after five seconds of draining is 2–3 times as great as the reference sorber and remains so after sixty seconds of draining. It is pointed out that a drain time of 5 seconds is used for the initial measurement since it is, of course, impossible to make an "instantaneous measurement" and 5 seconds has been found to give repeatable results.

It will be understood that the claims are intended to cover all changes and modifications of the preferred embodiments of the invention, herein chosen for the purpose of illustration which do not constitute departures from the spirit and scope of the invention.

What is claimed is:

1. A method of picking up oil, said method comprising contacting the oil with an oil sorber, said oil sorber comprising a plurality of adjacent strips of oleophilic, hydrophobic, flexible netting material bound together, said strips of netting material:
   (a) being from about 2 to about 10 inches in width;
   (b) being formed by extrusion with a plurality of sets of strands which cross at an angle;
   (c) having from 2 to about 5 strands per lineal inch;
   (d) being biaxially oriented; and
   (e) weighing from about ½ to about 5 pounds per thousand square feet.

2. The method of claim 1 wherein the plurality of adjacent strips are formed from one continuous piece of netting material.

3. The method of claim 1 wherein said netting material is a polyolefin.

4. The method of claim 1 wherein said netting material is selected from the group consisting of polyethylene and polypropylene.

5. The method of claim 1 wherein there are at least three (3) interstices across the width of the net strip.

* * * * *

UNITED STATES PATENT AND TRADEMARK OFFICE
CERTIFICATE OF CORRECTION

PATENT NO. : 4,340,486
DATED : July 20, 1982
INVENTOR(S) : Clare E. Swanson

It is certified that error appears in the above-identified patent and that said Letters Patent are hereby corrected as shown below:

Column 3, line 9, change "preferably" to --preferable--.

Column 3, line 29, change "sprockets" to --sockets--.

Column 4, line 10, change "metal" to --material--.

Signed and Sealed this

Twelfth Day of July 1983

[SEAL]

Attest:

Attesting Officer

GERALD J. MOSSINGHOFF

Commissioner of Patents and Trademarks